UNITED STATES PATENT OFFICE.

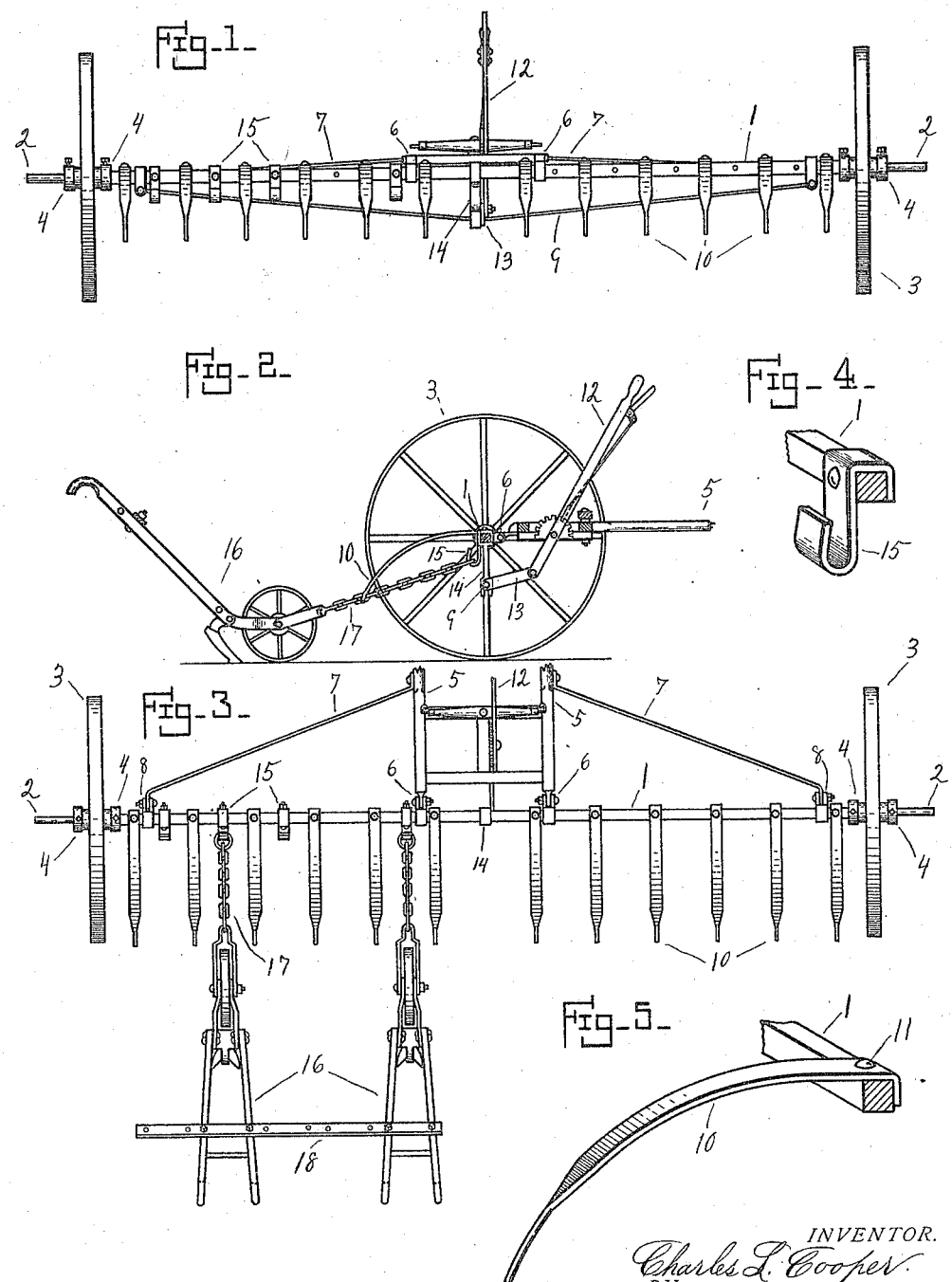

CHARLES L. COOPER, OF OKOLONA, KENTUCKY.

TRACTOR FOR WHEEL-HOES.

1,184,929.   Specification of Letters Patent.   Patented May 30, 1916.

Application filed March 29, 1915. Serial No. 17,614.

*To all whom it may concern:*

Be it known that I, CHARLES LINDSAY COOPER, a citizen of the United States, residing at Okolona, in the county of Jefferson and State of Kentucky, have invented a certain new and useful Improvement in Tractors for Wheel-Hoes, of which the following is a specification.

This invention relates to tractors for wheel hoes and has for an object the provision of means whereby a plurality of wheel hoes may be drawn by one source of power. Wheel hoes are used extensively in the cultivation of small crops such as onion sets. Land suitable for such crops is very valuable and necessarily must be utilized to its full capacity, hence the crops are closely planted. Onion sets are usually set out in rows about twelve inches apart necessitating their cultivation by hand hoes, or wheel hoes, both of which entail an amount of manual labor as the wheel hoes have to be pushed manually, progress is necessarily slow and laborious. And as such crops have to be cultivated frequently the labor adds largely to the cost thereof. I propose to lay out the rows so that the distance between certain rows, say the twelfth and the succeeding row shall be sufficient, say twenty inches, for the passage of a draft animal, which may draw an embodiment of my invention having connected thereto a plurality of wheel hoes, in number equal to the rows between the passages. The man behind the hoe relieved of the arduous task of pushing, will be able to travel faster and accomplish more, even though a man should be required for each hoe, which I do not contemplate as I consider one man for each group of hoes as sufficient.

With the foregoing and other objects in view, my invention consists of the novel arrangement and construction of parts illustrated in the accompanying drawing, which forms a part of this specification, wherein is set forth an embodiment of the invention, but it is to be understood that such changes and modifications may be resorted to as come within the scope of the appended claim.

Referring to the drawing wherein similar reference characters designate like parts in the several views:—Figure 1, is a rear elevation of an embodiment of my invention; Fig. 2, a side elevation; Fig. 3, a plan view showing two wheel hoes attached; Fig. 4, a detached detail, on an enlarged scale, of an attached hook; Fig. 5, a detached detail of a marker.

Referring to the drawing, —1— designates a shaft, or axle, of suitable cross section on the ends of which are journals 2—2. Wheels —3— mounted on these journals are adapted to be shifted therealong and secured in different positions thereon by means of set collars —4—. Thills —5— are flexibly connected with the shaft by means of couplings —6—. Braces —7— rigidly secured to the thills are flexibly connected to the shaft, near the ends thereof, by means of couplings —8—. The arrangement being such that the vertical movement of the draft animal will not be communicated to the tractor, and at the same time the thills and the braces act as a truss to prevent any backward flexure of the shaft that might occur through draft of attached cultivators. A truss rod —9— positioned below the shaft prevents flexure thereof under weight of attachments. A plurality of curved fingers, or markers —10— are secured by suitable means, such as bolts —11— at spaced intervals along the upper edge of the shaft and depend rearwardly therefrom. Normally the lower ends of the markers —10— are a short distance above the ground. A lever —12— suitably mounted on the rear portion of the thills and connected by means of a bar —13— with the stay rod, in proximity to the strut —14—, provides means whereby, by drawing the upper end of the lever —12— backward, the shaft may be rotated enough to bring the markers in contact with the ground to score, or mark the same to indicate the planting line. Intermediate each pair of markers there are secured on the shaft suitable means such as hooks —15—, whereby cultivators, such as wheel hoes —16— may be connected with the shaft, preferably flexible connectors such as chains —17— are used. It will be observed that by first laying off the ground by means of markers attached to the tractors no trouble will be experienced later in following the sinuosities of the rows with the cultivators connected to the tractors intermediate the markers. The markers are arranged in two groups, a central space separating the groups which is wider than those separating the individual markers. The cultivators, or wheel hoes, may be connected to the axle separately in which case a man will be required to guide each cultivator, or they may be connected in groups, by suitable means such as a bar —18—, in such case a man would be required for each group only.

Having thus described my invention so that anyone skilled in the art pertaining thereto may make and use the same,

I claim:—

In an implement of the class described, an axle, thills hinged thereto, braces rigidly attached to said thills and hinged on the axle co-incidently with the thills, a plurality of curved fingers secured at spaced intervals along the axle, a lever fulcrumed on the thills, and an arm extended from the axle wherewith the lever is connected.

CHARLES L. COOPER.

Copies of this patent may be obtained for five cents each, by addressing the "Commissioner of Patents, Washington, D. C."